US011159269B2

(12) United States Patent
Kakishima et al.

(10) Patent No.: US 11,159,269 B2
(45) Date of Patent: Oct. 26, 2021

(54) METHOD OF ACQUIRING CHANNEL STATE INFORMATION (CSI), USER EQUIPMENT (UE), AND TRANSMISSION AND RECEPTION POINT (TRP)

(71) Applicants: NTT DOCOMO, INC., Tokyo (JP); DOCOMO INNOVATIONS, INC., Palo Alto, CA (US)

(72) Inventors: Yuichi Kakishima, Tokyo (JP); Chongning Na, Tokyo (JP); Satoshi Nagata, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 71 days.

(21) Appl. No.: 16/610,818

(22) PCT Filed: May 3, 2018

(86) PCT No.: PCT/US2018/030811
§ 371 (c)(1),
(2) Date: Nov. 4, 2019

(87) PCT Pub. No.: WO2018/204590
PCT Pub. Date: Nov. 8, 2018

(65) Prior Publication Data
US 2020/0067631 A1    Feb. 27, 2020

Related U.S. Application Data

(60) Provisional application No. 62/501,312, filed on May 4, 2017.

(51) Int. Cl.
*H04L 1/00* (2006.01)
*H04L 5/00* (2006.01)
(Continued)

(52) U.S. Cl.
CPC .......... *H04L 1/0026* (2013.01); *H04L 5/0051* (2013.01); *H04L 5/0098* (2013.01);
(Continued)

(58) Field of Classification Search
CPC ..... H04L 5/0051; H04L 5/005; H04L 5/0092; H04L 5/0053; H04L 5/0098;
(Continued)

(56) References Cited

U.S. PATENT DOCUMENTS

2019/0349784 A1* 11/2019 Tang ..................... H04L 5/0023
2019/0356452 A1* 11/2019 Yokomakura ......... H04W 24/10
(Continued)

FOREIGN PATENT DOCUMENTS

JP    2020-031248 A    2/2020

OTHER PUBLICATIONS

Office Action issued in the counterpart Japanese Patent Application No. 2019-559736, dated Oct. 27, 2020 (8 pages).
(Continued)

*Primary Examiner* — Brian D Nguyen
(74) *Attorney, Agent, or Firm* — Osha Bergman Watanabe & Burton LLP

(57) ABSTRACT

A method of acquiring Channel State Information (CSI) includes transmitting, from a Transmission and Reception Point (TRP) to a User Equipment (UE), information indicating that both of a Resource setting and a CSI reporting setting are commonly set to activation or deactivation. The Resource setting being set to the activation causes the UE to assume that CSI-Reference Signals (RSs) are to be transmitted from the TRP. The CSI reporting setting being set to the activation triggers the UE to perform CSI reporting. The method further includes receiving, with the UE, the CSI-RSs transmitted in accordance with a predetermined type of time domain behavior when the Resource setting is set to the
(Continued)

activation. The method further includes performing, with the UE, the CSI reporting in accordance with the predetermined type of time domain behavior when the CSI reporting setting is set to activation.

4 Claims, 20 Drawing Sheets

(51) Int. Cl.
*H04W 72/04* (2009.01)
*H04W 80/02* (2009.01)

(52) U.S. Cl.
CPC ..... *H04W 72/042* (2013.01); *H04W 72/0493* (2013.01); *H04W 80/02* (2013.01)

(58) Field of Classification Search
CPC ... H04L 5/0057; H04L 5/0023; H04L 1/0026; H04L 1/0027; H04W 72/0493; H04W 72/042; H04W 80/02
See application file for complete search history.

(56) References Cited

U.S. PATENT DOCUMENTS

| | | | | |
|---|---|---|---|---|
| 2019/0380114 | A1 | 12/2019 | Yokomakura et al. | |
| 2020/0015109 | A1* | 1/2020 | Frenne | H04L 5/0048 |
| 2020/0037260 | A1* | 1/2020 | Fu | H04W 52/325 |
| 2020/0052847 | A1* | 2/2020 | Manolakos | H04L 5/0094 |
| 2020/0127786 | A1* | 4/2020 | Kwak | H04L 5/0026 |
| 2020/0359250 | A1* | 11/2020 | Sayana | H04B 7/0626 |
| 2021/0050895 | A1* | 2/2021 | Kang | H04B 7/0632 |

OTHER PUBLICATIONS

Sharp; "CSI-RS transmission and CSI reporting for NR MIMO"; 3GPP TSG RAN WG1 #88bis Meeting, R1-1705469 Spokane, USA; Apr. 3-7, 2017 (4 pages).
Ericsson; "On dynamic triggering for CSI reports and CSI-RS"; 3GPP TSG-RAN WG1 #88bis, R1-1705919; Spokane, USA; Apr. 3-7, 2017 (6 pages).
International Search Report issued in PCT/US2018/030811 dated Sep. 6, 2018 (2 pages).
Written Opinion of the International Searching Authority issued in PCT/US2018/030811 dated Sep. 6, 2018 (9 pages).
Huawei, HiSilicon; "CSI Acquisition Framework"; 3GPP TSG RAN WG1 Meeting #88bis, R1-1704226; Spokane, USA; Apr. 3-7, 2017 (8 pages).
NTT Docomo; "CSI Acquisition Schemes for NR"; 3GPP TSG RAN WG1 NR Ad-Hoc Meeting, R1-1700596; Spokane, USA; Jan. 16-20, 2017 (5 pages).
Qualcomm Incorporated; "Details of CSI Framework"; 3GPP TSG RAN WG1 #88bis, R1-1705584; Spokane, USA; Apr. 3-7, 2017 (5 pages).
Huawei, HiSilicon; "Independent and joint control of CSI-RS transmission and CSI reporting for NR MIMO"; 3GPP TSG RAN WG1 #88 Meeting, R1-1701681; Athens, Greece; Feb. 13-17, 2017 (7 pages).
3GPP TS 36.211 V14.2.0; "3rd Generation Partnership Project; Technical Specification Group Radio Access Network; Evolved Universal Terrestrial Radio Access (E-UTRA); Physical channesl and modulation (Release 14)"; Mar. 2017 (194 pages).
3GPP TS 36.213 V14.2.0; "3rd Generation Partnership Project; Technical Specification Group Radio Access Network; Evolved Universal Terrestrial Radio Access (E-UTRA); Physical layer procedures (Release 14)"; Mar. 2017 (454 Pages).

* cited by examiner

FIG. 4

| | | CSI reporting setting | |
|---|---|---|---|
| | | On | Off |
| Resource setting | On | UE assumes that CSI-RS is transmitted.<br><br>UE performs CSI reporting. | UE assumes that CSI-RS is transmitted.<br><br>UE does not perform CSI reporting. |
| | Off | UE assumes that CSI-RS is not transmitted.<br><br>UE performs:<br>- CSI reporting using CSI-RS resource other than CSI-RS resource designated in Resource setting;<br>- CSI reporting based on DM-RS; and/or<br>- Feedback of information other than CSI. | UE assumes that CSI-RS is not transmitted.<br><br>UE does not perform CSI reporting. |

FIG. 5

|  |  | CSI reporting setting | |
|---|---|---|---|
|  |  | On | Off |
| Resource setting | On | UE assumes that CSI-RS is transmitted.<br><br>UE performs CSI reporting. | UE assumes that CSI-RS is transmitted.<br><br>UE does not perform CSI reporting. |
|  | Off | UE assumes that CSI-RS is transmitted.<br><br>UE performs CSI reporting. | UE assumes that CSI-RS is not transmitted.<br><br>UE does not perform CSI reporting. |

FIG. 6

|  |  | CSI reporting setting | |
|---|---|---|---|
|  |  | On | Off |
| Resource setting | On | UE assumes that CSI-RS is transmitted.<br><br>UE performs CSI reporting. | UE assumes that CSI-RS is transmitted.<br><br>UE does not perform CSI reporting. |
|  | Off | UE assumes that CSI-RS is not transmitted.<br><br>UE does not perform CSI reporting (UE performs CSI reporting only when "On" is designated in both Resource setting and CSI reporting setting). | UE assumes that CSI-RS is not transmitted.<br><br>UE does not perform CSI reporting. |

FIG. 8

| Resource setting and CSI reporting setting | |
|---|---|
| On | Off |
| UE assumes that CSI-RS is transmitted.<br><br>UE performs CSI reporting. | UE assumes that CSI-RS is not transmitted.<br><br>UE does not perform CSI reporting. |

FIG. 15

| Resource setting | Resource set | On/Off |
|---|---|---|
| Resource setting #0 | Resource set #0 | On |
| | Resource set #1 | Off |
| | Resource set #2 | Off |
| Resource setting #1 | Resource set #3 | Off |
| Resource setting #2 | Resource set #0 | On |
| | Resource set #2 | Off |

FIG. 16

| Resource setting | Resource set | On/Off |
|---|---|---|
| Resource setting #0 | Resource set #0 | On |
| | Resource set #1 | Off |
| | Resource set #2 | On |
| Resource setting #1 | Resource set #3 | Off |
| Resource setting #2 | Resource set #0 | On |
| | Resource set #2 | On |

METHOD OF ACQUIRING CHANNEL STATE INFORMATION (CSI), USER EQUIPMENT (UE), AND TRANSMISSION AND RECEPTION POINT (TRP)

TECHNICAL FIELD

The present invention generally relates to an activation/deactivation method of CSI acquisition and beam management in a wireless communication system including a transmission and reception point (TRP) and a user equipment (UE).

BACKGROUND ART

In a New Radio (NR) system, Channel State Information (CSI) acquisition and beam management schemes are newly designed to achieve efficient precoding with massive antenna array. In such schemes for the NR system, CSI-Reference Signal (RS) transmission and CSI reporting are performed in accordance with three types of time domain behavior (periodic, aperiodic, and semi-persistent). Furthermore, in such schemes, gNodeB (gNB) can turn on/off transmission of CSI-RS using at least one of Media Access Control Control Element (MAC CE) and Downlink Control Information (DCI) signaling.

On the other hand, legacy technologies under Long Term Evolution (LTE) and LTE-Advanced (LTE-A) do not support a method to turn on/off the CSI-RS transmission and the CSI reporting until LTE Rel. 13.

Furthermore, User Equipment (UE) procedures in the newly designed CSI acquisition and beam management schemes using the method to turn on/off the CSI-RS transmission and the CSI reporting are not determined in the 3GPP standard. As a result, the UE may not perform the CSI-reporting properly when the CSI-RS transmission and the CSI reporting are turned on/off.

CITATION LIST

Non-Patent Reference

Non-Patent Reference 1: 3GPP, TS 36.211 V 14.2.0
Non-Patent Reference 2: 3GPP, TS 36.213 V14.2.0

SUMMARY

One or more embodiments of the present invention relate to a method of acquiring Channel State Information (CSI) that includes transmitting, from a Transmission and Reception Point (TRP) to a User Equipment (UE), information indicating that both of a Resource setting and a CSI reporting setting are commonly set to activation or deactivation. The Resource setting being set to the activation causes the UE to assume that CSI-Reference Signals (RSs) are to be transmitted from the TRP. The CSI reporting setting being set to the activation triggers the UE to perform CSI reporting. The method further includes receiving, with the UE, the CSI-RSs transmitted in accordance with a predetermined type of time domain behavior when the Resource setting is set to the activation. The method further includes performing, with the UE, the CSI reporting in accordance with the predetermined type of time domain behavior when the CSI reporting setting is set to activation.

One or more embodiments of the present invention relate to a UE that includes a receiver that receives, from a TRP, information indicating that both of a Resource setting and a CSI reporting setting are commonly set to activation or deactivation, a processor that determines that CSI-RSs are to be transmitted from the TRP when the Resource setting is set to the activation, and a transmitter. The CSI reporting setting being set to the activation triggers the UE to perform CSI reporting. The receiver receives the CSI-RSs transmitted in accordance with a predetermined type of time domain behavior based on the determining that the CSI-RSs are to be transmitted. The transmitter performs the CSI reporting in accordance with the predetermined type of time domain behavior when the CSI reporting setting is set to activation.

One or more embodiments of the present invention relate to a TRP that includes a transmitter that transmits, to a UE, information indicating that both of a Resource setting and a CSI reporting setting are commonly set to activation or deactivation and a receiver. The Resource setting being set to the activation causes the UE to assume that CSI-RSs are to be transmitted from the TRP. The CSI reporting setting being set to the activation triggers the UE to perform CSI reporting. The transmitter transmits, to the UE, the CSI-RSs in accordance with a predetermined type of time domain behavior when the Resource setting is set to the activation. The receiver receives the CSI reporting in accordance with the predetermined type of time domain behavior from the UE.

One or more embodiments of the present invention can provide a method to clarify a UE procedure that is not determined in the 3GPP standard.

Other embodiments and advantages of the present invention will be recognized from the description and figures.

BRIEF DESCRIPTION OF THE DRAWINGS

FIG. 4 is a diagram showing UE procedure information according to one or more embodiments of the first example of the present invention.

FIG. 5 is a diagram showing UE procedure information according to one or more embodiments of the first example of the present invention.

FIG. 6 is a diagram showing UE procedure information according to one or more embodiments of the first example of the present invention.

FIG. 8 is a diagram showing UE procedure information according to one or more embodiments of the second example of the present invention.

FIG. 15 is a diagram showing information indicating on/off of Resource sets according to one or more embodiments of a fifth modified example of the present invention.

FIG. 16 is a diagram showing information indicating on/off of Resource sets according to one or more embodiments of the fifth modified example of the present invention.

DETAILED DESCRIPTION

Embodiments of the present invention will be described in detail below, with reference to the drawings. In embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

In the following description, numerous details are set forth to provide a more thorough explanation of the present invention. It will be apparent, however, to one skilled in the art, that the present invention may be practiced without these specific details. In other instances, well-known structures and devices are shown in block diagram form, rather than in detail, in order to avoid obscuring the present invention.

Figure 1:
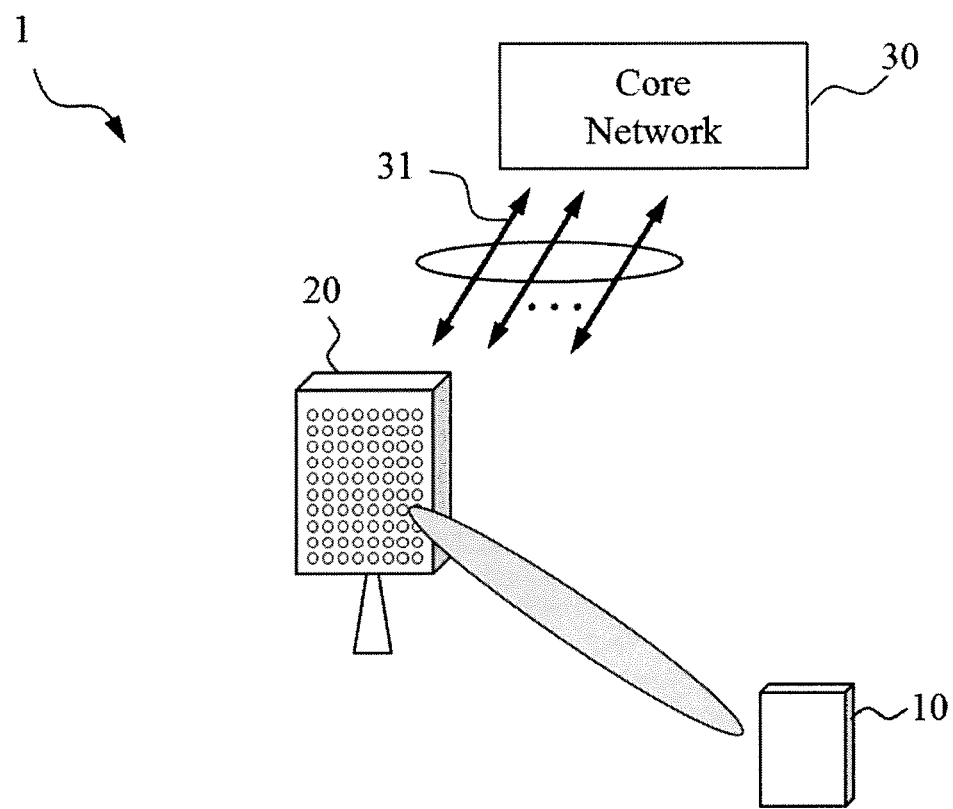
FIG. 1 is a diagram showing a configuration of a wireless communication system according to one or more embodiments of the present invention.

FIG. 1 is a wireless communications system 1 according to one or more embodiments of the present invention. The wireless communication system 1 includes a user equipment (UE) 10, a transmission and reception point (TRP) 20, and a core network 30. The wireless communication system 1 may be a New Radio (NR) system. The wireless communication system 1 is not limited to the specific configurations described herein and may be any type of wireless communication system such as an LTE/LTE-Advanced (LTE-A) system.

The TRP 20 may communicate uplink (UL) and downlink (DL) signals with the UE 10 in a cell of the TRP 20. The DL and UL signals may include control information and user data. The TRP 20 may communicate DL and UL signals with the core network 30 through backhaul links 31. The TRP 20 may be referred to as a base station (BS). The TRP 20 may be gNodeB (gNB).

The TRP 20 includes antennas, a communication interface to communicate with an adjacent TRP 20 (for example, X2 interface), a communication interface to communicate with the core network 30 (for example, S1 interface), and a CPU (Central Processing Unit) such as a processor or a circuit to process transmitted and received signals with the UE 10. Operations of the TRP 20 may be implemented by the processor processing or executing data and programs stored in a memory. However, the TRP 20 is not limited to the hardware configuration set forth above and may be realized by other appropriate hardware configurations as understood by those of ordinary skill in the art. Numerous TRPs 20 may be disposed so as to cover a broader service area of the wireless communication system 1.

The UE 10 may communicate DL and UL signals that include control information and user data with the TRP 20 using Multi Input Multi Output (MIMO) technology. The UE 10 may be a mobile station, a smartphone, a cellular phone, a tablet, a mobile router, or information processing apparatus having a radio communication function such as a wearable device. The wireless communication system 1 may include one or more UEs 10.

The UE 10 includes a CPU such as a processor, a RAM (Random Access Memory), a flash memory, and a radio communication device to transmit/receive radio signals to/from the TRP 20 and the UE 10. For example, operations of the UE 10 described below may be implemented by the CPU processing or executing data and programs stored in a memory. However, the UE 10 is not limited to the hardware configuration set forth above and may be configured with, e.g., a circuit to achieve the processing described below.

(Framework of Beam Management and CSI Acquisition)

Figure 2:
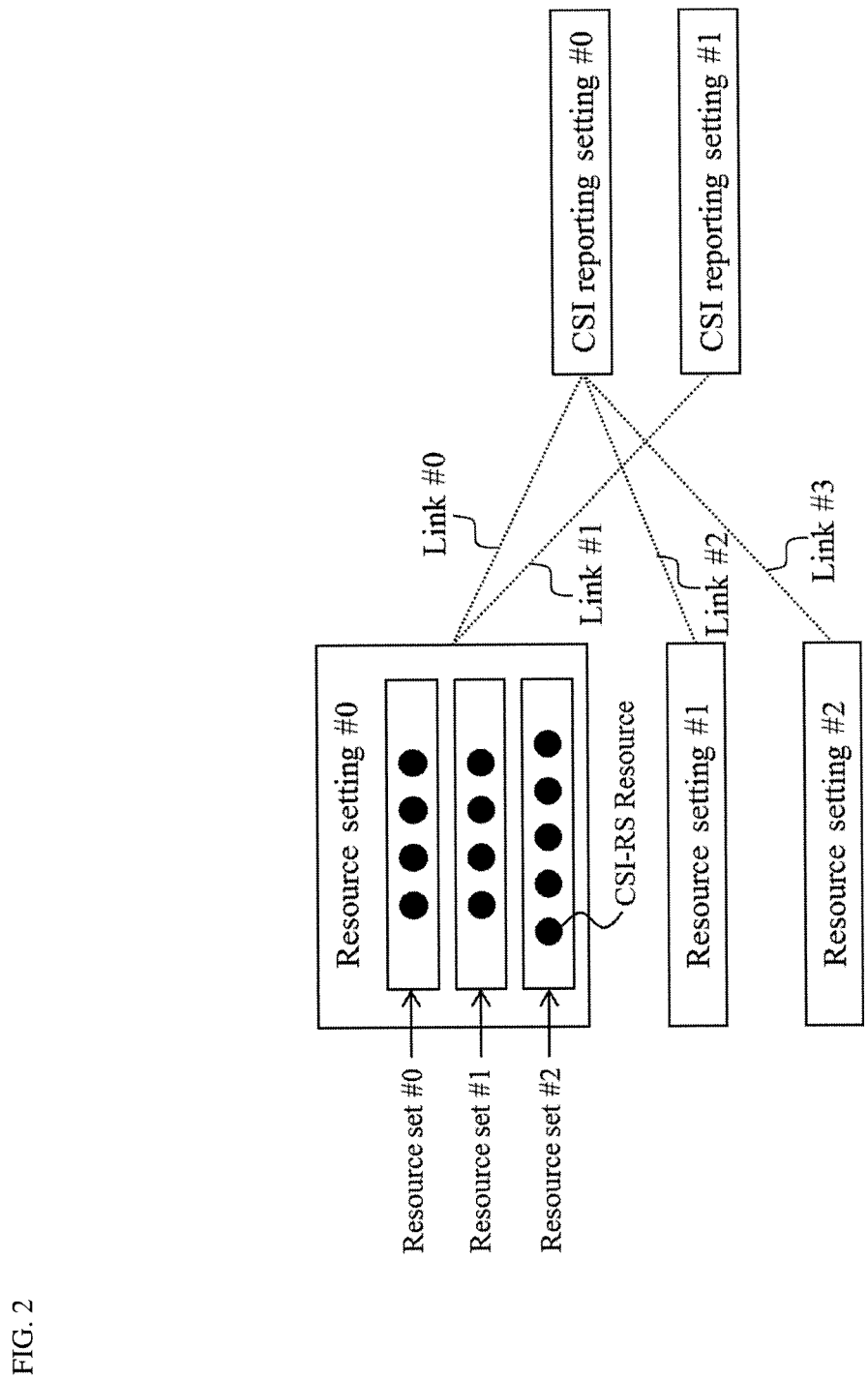
FIG. 2 is a diagram showing a configuration of a Resource setting, a CSI reporting setting, and a Link according to one or more embodiments of the present invention.

According to one or more embodiments of the present invention, the UE 10 may perform beam management and CSI acquisition using a "Resource setting," a "CSI reporting setting," and a "Link." FIG. 2 is a diagram showing a configuration of the Resource setting, the CSI reporting setting" and the "Link" according to one or more embodiments of the present invention. As shown in FIG. 2, the Resource setting is associated with the CSI reporting setting via Link. In FIG. 2, for example, the Resource setting #0 is associated with the CSI reporting settings #0 and #1 via Links #0 and #1, respectively. The Resource settings #1 and #2 are associated with the CSI reporting setting #0 via the Links #2 and #3, respectively.

The Resource setting includes at least one "Resource set." In FIG. 2, the Resource setting #0 includes the Resource sets #0-#2. Each Resource set includes at least one CSI-RS resource. Here the "Resource set" can be called as "CSI-RS resource set."

Furthermore, the Resource setting may include Channel measurement resource (CMR) information, Interference Measurement Resource (IMR) information, and Time domain behavior. The CMR information includes RS information (e.g., CSI-RS resource, Demodulation Reference Signal (DM-RS) resource, Sounding Reference Signal resource, and the number of antenna ports, resource element (RE) information). The IMR information includes information related to at least one of a Zero Power (ZP) CSI-RS, a Non Zero Power (NZP) CSI-RS, and a DM-RS.

In the time domain behavior of the Resource setting, at least one of three types of time domain behavior (periodic, aperiodic, and semi-persistent) for the CSI-RS transmission may be designated. The time domain behavior may include periodicity and a timing offset for periodic, aperiodic and semi-persistent transmission.

For example, in the time domain behavior of the Resource setting, different parameters of periodic, aperiodic, and semi-persistent may be designated for each of the CMR information and IMR information. For example, in the time domain behavior of the Resource setting, the common parameter may be designated for both of the CMR information and IMR information.

For example, in the time domain behavior of the Resource setting, the different parameters may be designated for each of the Resource sets. For example, in the time domain behavior of the Resource setting, the common parameter may be designated for Resource sets.

For example, in the time domain behavior of the Resource setting, the different parameters may be designated for each of the CSI-RS resources. For example, in the time domain behavior of the Resource setting, the common parameter may be designated for the CSI-RS resources.

The CSI reporting setting includes time domain behavior, Frequency granularity, CSI parameters, CSI types, and Codebook information. In the time domain behavior of the CSI reporting setting, at least one of three types of time domain behavior (periodic, aperiodic, and semi-persistent) for the CSI-RS reporting may be designated. The Frequency granularity may indicate subband, partial band or wideband. In the CSI parameters, Rank Indicator (RI), CSI-RS resource indicator (CRI), Precoding Matrix Indicator (PMI), Channel Quality Indicator (CQI), and/or Reference Signal Received Power (RSRP) may be designated. Each of the CSI parameters may be configured on/off. In the CSI types, for example, CSI type I or II may be designated.

In one or more embodiments of the present invention, on/off of the Resource setting and the CSI reporting setting is referred to as activation/deactivation (on/off) of CSI-RS transmission and CSI reporting, respectively.

In one or more embodiments of the present invention, the Resource setting being set to the activation (on) may cause the UE 10 to assume that CSI-RSs are to be transmitted from the TRP. The UE 10 may receive the CSI-RSs (e.g., aperiodic CSI-RSs or semi-persistent CSI-RSs) based on the assumption.

In one or more embodiments of the present invention, the Resource setting being set to the deactivation (off) may cause the UE 10 to assume that CSI-RSs are not to be transmitted from the TRP.

In one or more embodiments of the present invention, the CSI reporting setting being set to the activation (on) may trigger the UE 10 to perform CSI reporting.

In one or more embodiments of the present invention, the CSI reporting setting being set to the deactivation (off) may not trigger the UE 10 to perform CSI reporting.

First Example

According to one or more embodiments of a first example of the present invention, "on/off" may be independently designated in each of the Resource setting and the CSI reporting setting and the UE 10 may perform rate matching based on the UE procedure determined in accordance with the "on/off" of each of the Resource setting and the CSI reporting setting. For example, "on/off" of the Resource setting can be informed in terms of "on/off" of CSI-RS resource set or CSI-RS resource.

Figure 3:
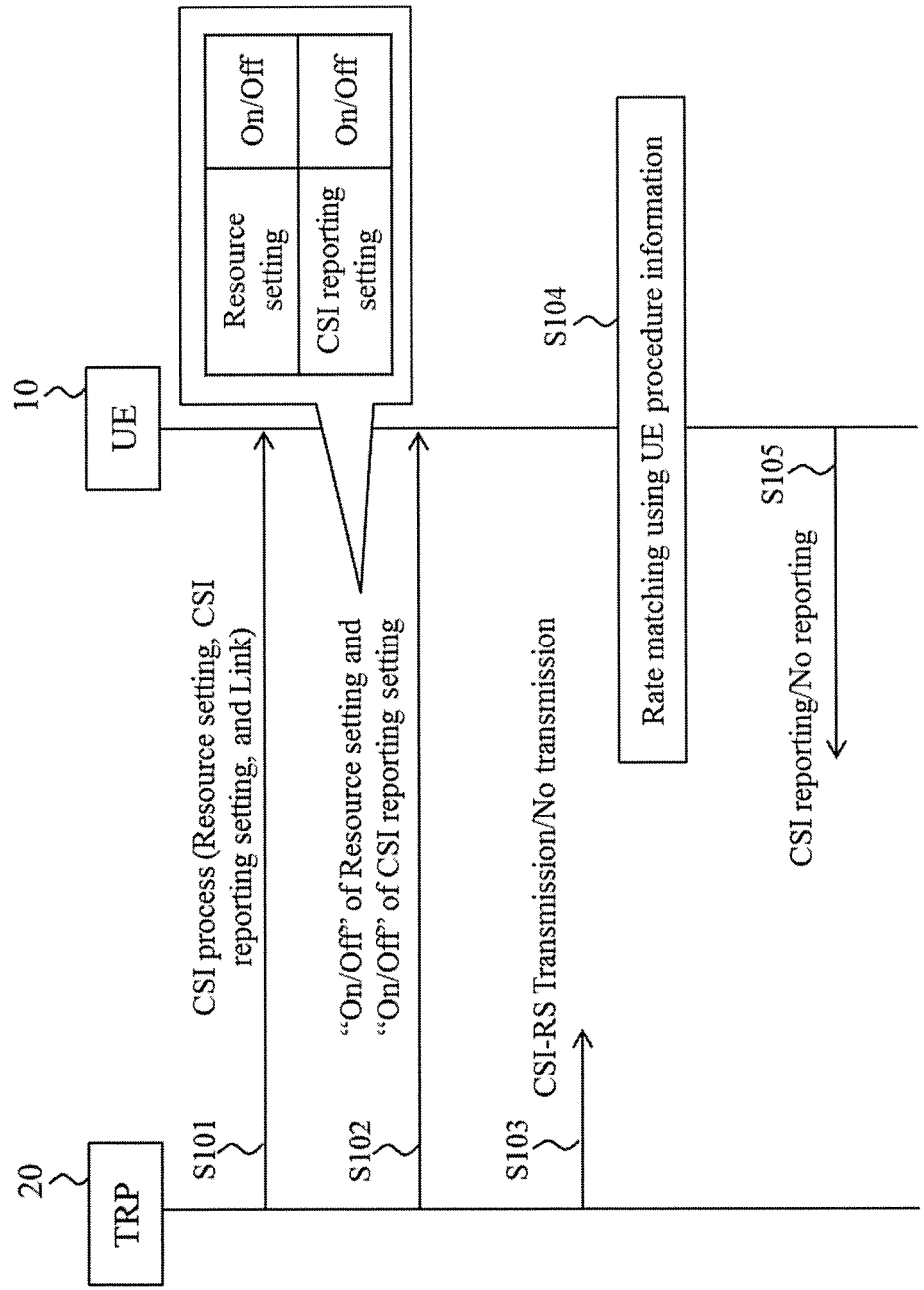
FIG. 3 is a sequence diagram showing an operation example of a CSI acquisition scheme according to one or more embodiments of a first example of the present invention.

FIG. 3 is a sequence diagram showing an example operation of a CSI acquisition scheme according to one or more embodiments of the first example of the present invention.

As shown in FIG. 3, at step S101, the TRP 20 may transmit a CSI process including the Resource setting, the CSI reporting setting, and the Link to the UE 20. The Resource setting and the CSI reporting setting include the Time domain behavior, respectively. The CSI process may be referred to as a CSI framework or another signal/information.

At step S102, the TRP 20 may transmit on/off information indicating on/off of the Resource setting and on/off of the CSI reporting setting. On/off of the Resource setting and the CSI reporting setting may be independently designated.

For example, the TRP 20 may designate "on" of the Resource setting when the TRP 20 transmits the CSI-RS and designate "off" of the Resource setting when the TRP 20 does not transmit the CSI-RS.

For example, the TRP 20 may designate "on" of the CSI reporting setting when the TRP 20 triggers the UE 10 to perform the CSI reporting and designate "off" of the CSI reporting setting when the TRP 20 does not trigger the UE 10 to perform the CSI reporting.

When the Time domain behavior of the CSI-RS transmission in the Resource setting indicates "aperiodic" or "semi-persistent," the on/off information may be transmitted using at least one of MAC CE and DCI. When the Time domain behavior of the CSI-RS transmission in the Resource setting indicates "periodic," the on/off information may be transmitted or not be transmitted.

At step S103, the TRP 20 may transmit or not transmit the CSI-RS based on the on/off of the Resource setting.

At step S104, the UE 10 may perform rate matching (and/or puncture) using UE procedure information indicated in a table of FIG. 4. FIG. 4 shows the UE procedure information indicating UE procedures in each combination of on/off of the Resource setting and the CSI reporting setting.

As shown in FIG. 4, when "on" is designated in both of the Resource setting and the CSI reporting setting, the UE 10 assumes that the CSI-RS is transmitted and the UE 10 performs the CSI reporting.

When "on" is designated in the Resource setting and "off" is designated in the CSI reporting setting, the UE 10 assumes that the CSI-RS is transmitted and the UE 10 does not perform the CSI reporting.

When "off" is designated in the Resource setting and "on" is designated in the CSI reporting setting, the UE 10 assumes that the CSI-RS is not transmitted and the UE 10 performs the CSI reporting using CSI-RS resource other than CSI-RS resource originally designated in Resource setting. As another example, the UE 10 may perform the CSI reporting based on the DM-RS. As another example, the UE 10 may transmit feedback information other than CSI.

When "off" is designated in both of the Resource setting and the CSI reporting setting, the UE 10 assumes that the CSI-RS is not transmitted and the UE 10 does not perform the CSI reporting.

As another example, the UE 10 may perform the UE procedure based on a predetermined table of FIG. 5 or FIG. 6.

As shown in FIG. 5, when "off" is designated in the Resource setting and "on" is designated in the CSI reporting setting, the UE 10 assumes that the CSI-RS is transmitted and the UE 10 performs the CSI reporting.

As shown in FIG. 6, when "off" is designated in the Resource setting and "on" is designated in the CSI reporting setting, the UE 10 assumes that the CSI-RS is not transmitted and the UE 10 does not perform CSI reporting. In other words, the UE 10 performs CSI reporting only when "on" is designated in both Resource setting and CSI reporting setting.

UE procedures of FIGS. 5 and 6 in combinations other than the combination "off" of the Resource setting and "on" of the CSI reporting setting are similar to the UE procedures of FIG. 4.

In one or more embodiments of a first example of the present invention, the information indicating the UE procedures of FIGS. 4-6 may be used for operations other than the designated CSI-RS resource notification and CSI reporting.

Turning to FIG. 3, at step S105, the UE 10 may perform the CSI reporting or not perform the CSI reporting based on the UE procedure information.

Second Example

According to one or more embodiments of a second example of the present invention, "on/off" (activation or deactivation) may be commonly designated in both of the Resource setting and the CSI reporting setting and the UE 10 may perform rate matching based on the UE procedure in accordance with the common "on/off" between the Resource setting and the CSI reporting setting. This common "on/off" information can be notified in terms of "on/off" of Link.

Figure 7:
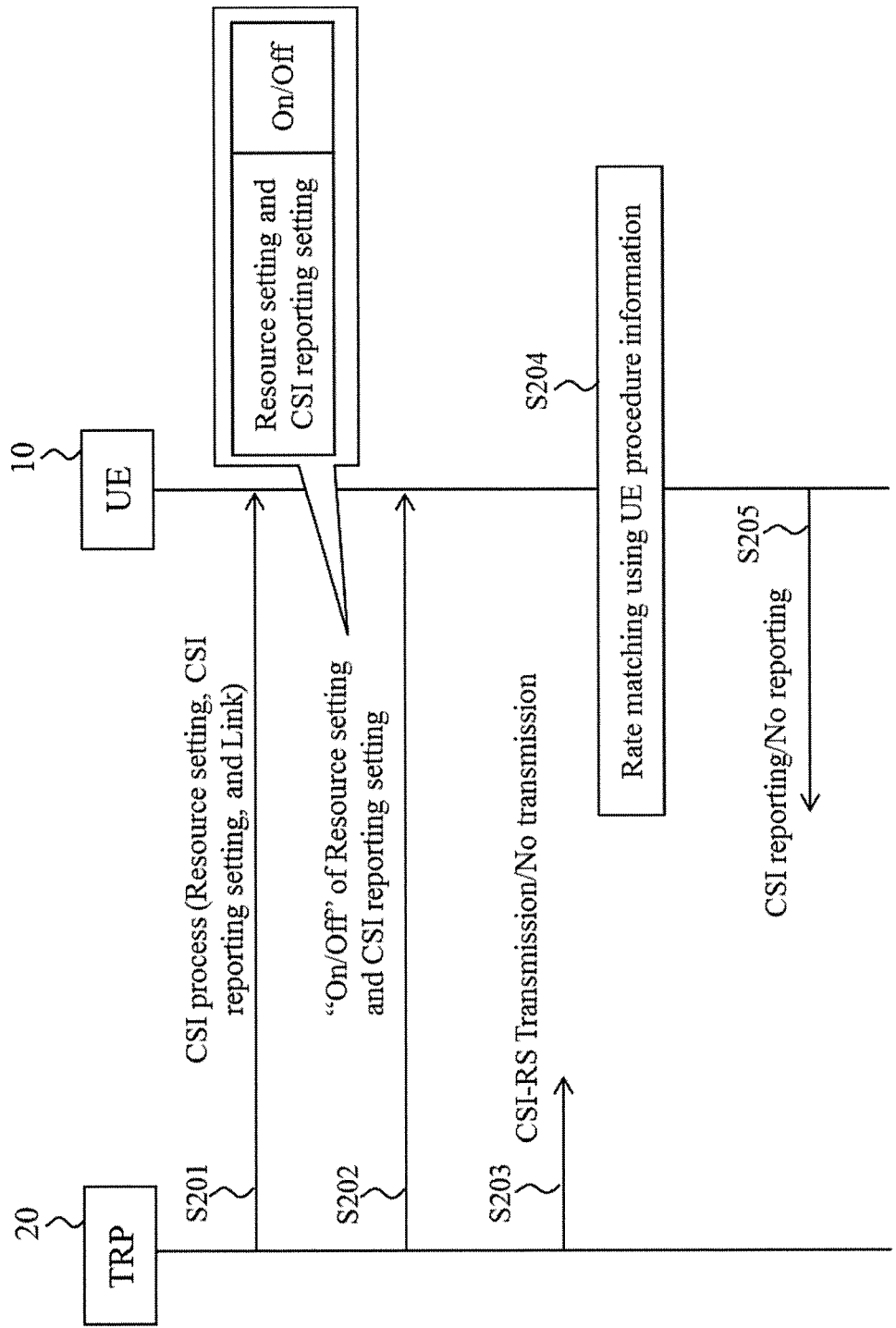
FIG. 7 is a sequence diagram showing an operation example of a CSI acquisition scheme according to one or more embodiments of a second example of the present invention.

FIG. 7 is a sequence diagram showing an example operation of a CSI acquisition scheme according to one or more embodiments of the second example of the present invention.

As shown in FIG. 7, at step S201, the TRP 20 may transmit a CSI process including the Resource setting, the CSI reporting setting, and the Link to the UE 20. For example, a type of the Time domain behavior of the Resource setting may be identical to a type of the Time domain behavior of the CSI reporting setting. For example, when "aperiodic (or semi-persistent)" is designated in the Time domain behavior of the Resource setting, "aperiodic (or semi-persistent)" is designated in the Time domain behavior of the CSI reporting setting.

At step S202, the TRP 20 may transmit on/off information indicating the common parameter of on/off between the Resource setting and the CSI reporting setting when the identical type in the Time domain behavior of the Resource setting and the CSI reporting setting is designated. For example, when "on (or off)" of the Resource setting is designated, "on (or off)" of the CSI reporting setting is designated.

At step S203, the TRP 20 may transmit or not transmit the CSI-RS based on the on/off of the Resource setting.

At step S204, the UE 10 may perform rate matching (and/or puncture) using UE procedure information indicated in a table of FIG. 8. FIG. 8 shows the UE procedure information indicating UE procedures in each combination of on/off of the Resource setting and the CSI reporting setting.

As shown in FIG. 8, when "on" is designated in both of the Resource setting and the CSI reporting setting, the UE 10 assumes that the CSI-RS is transmitted and the UE 10 performs the CSI reporting.

When "off" is designated in both of the Resource setting and the CSI reporting setting, the UE 10 assumes that the CSI-RS is not transmitted and the UE 10 does not perform the CSI reporting.

Turning to FIG. 7, at step S205, the UE 10 may perform the CSI reporting or not perform the CSI reporting based on the UE procedure information.

Thus, according to one or more embodiments of the second example of the present invention, the TRP 20 transmits, to the UE 10, information (e.g., on/off information) indicating that both of the Resource setting and the CSI reporting setting are commonly set to activation or deactivation. The UE 10 receives the CSI-RSs transmitted from the TRP 10 in accordance with a predetermined type of time domain behavior (e.g., aperiodic or semi-persistent) when the Resource setting is set to the activation. The UE 10 performs the CSI reporting in accordance with the predetermined type of time domain behavior (e.g., aperiodic or semi-persistent) when the CSI reporting setting is set to activation. When the predetermined time domain behavior is aperiodic, the information may be DCI. When the predetermined time domain behavior is semi-persistent, the information may be MAC CE.

Further, one or more embodiments of the second example of the present invention, the Resource setting includes one or more Resource sets and the activation (on) is set in each of the one or more CSI-RS resource sets. Further, the activation (on) is set to one of the one or more Resource sets.

Second Modified Example

According to one or more embodiments of a second modified example of the present invention, "on/off" may be designated in the Link that associates the Resource setting to the CSI reporting setting. FIGS. 9A, 9B, 10A, and 10B are sequence diagrams showing an example operation of a CSI acquisition scheme according to one or more embodiments of the second modified example of the present invention. Similar steps in 9A, 9B, 10A, and 10B to steps in FIG. 7 may have the same reference label.

Figure 9A:
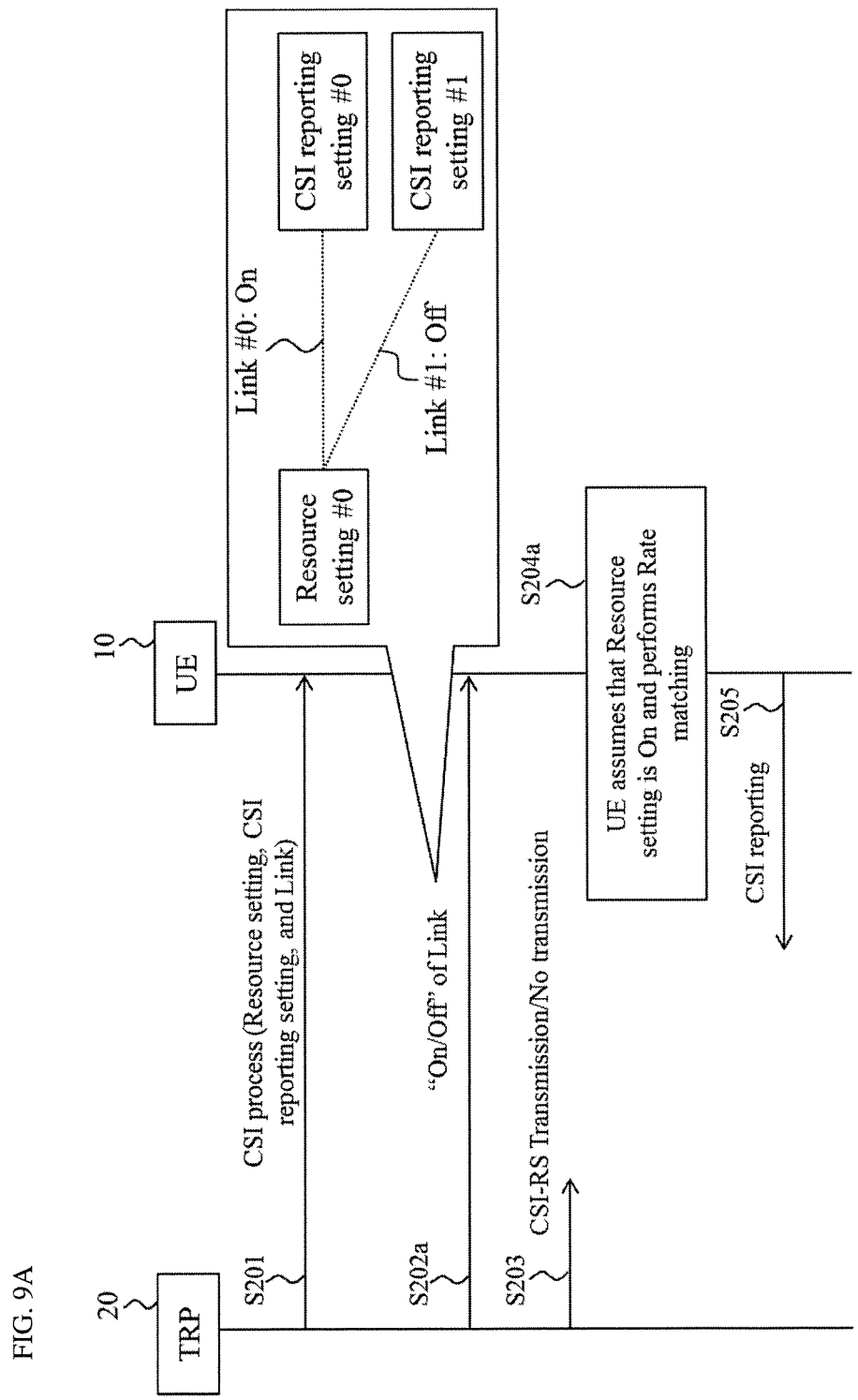
FIGS. 9A and 9B are sequence diagrams showing an operation example of a CSI acquisition scheme according to one or more embodiments of a second modified example of the present invention.
Figure 9B:
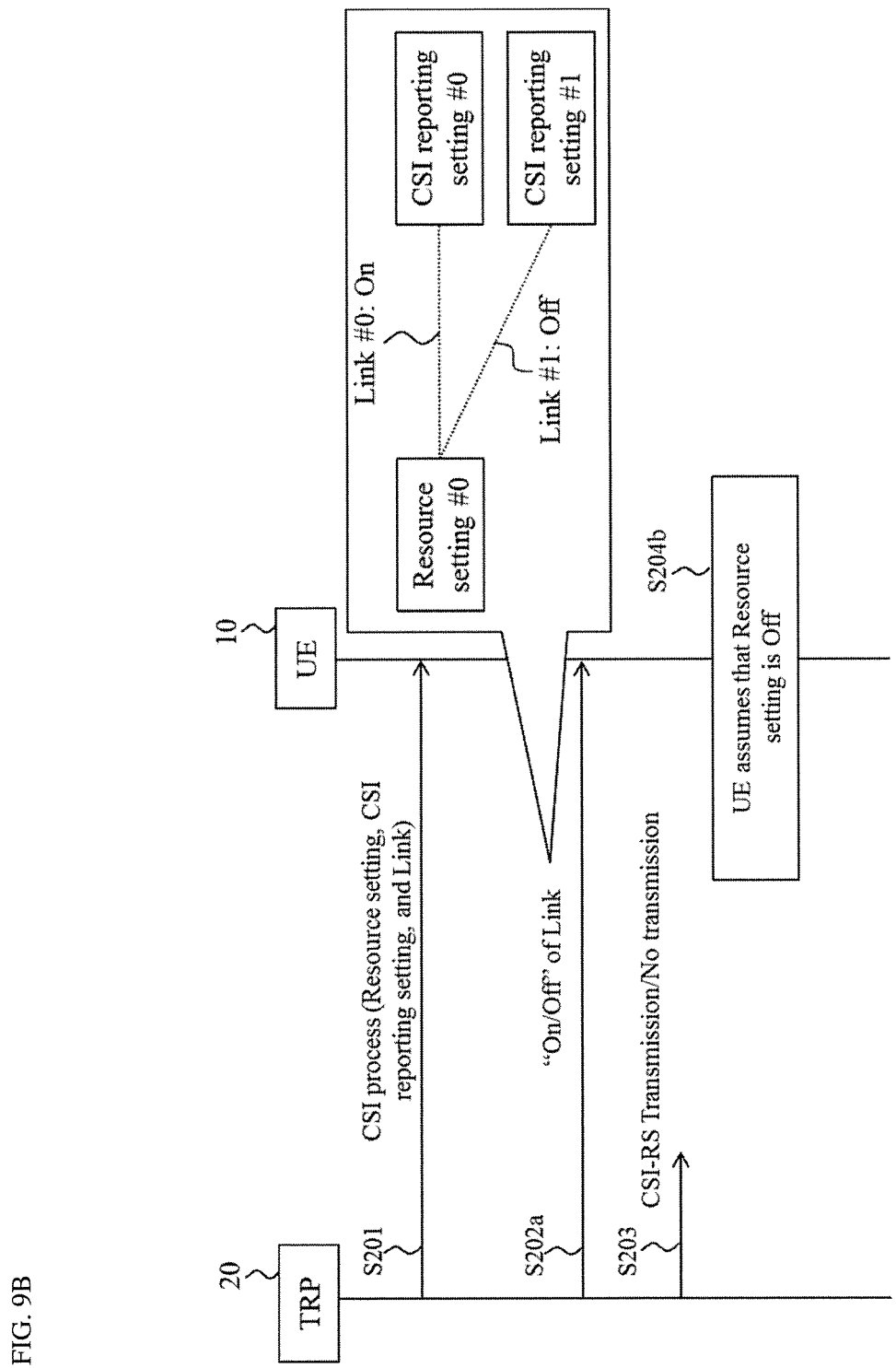

FIGS. 9A and 9B show operation of the UE 10 in case that one Resource setting is linked using multiple Links in which both "on" and "off" are designated.

As shown in FIG. 9A, at step S202a, the TRP 20 may transmit on/off information indicating on/off of the Link. In FIG. 9A, for example, in the on/off information, Resource setting #0 is linked to CSI reporting settings #0 and #1 via Links #0 and #1, respectively. On is designated in the Link #0 and off is designated in the Link #1.

At step S204b, when one Resource setting (Resource setting #0) is linked using multiple Links (Links #0 and #1) in which both "on" and "off" are designated, the UE 10 assumes the Resource setting is "on." The UE 10 performs the CSI reporting based on the CSI reporting setting (CSI reporting setting #0) linked using the Link (Link #0) in which on is designated.

In FIG. 9B, at step S204b, when one Resource setting (Resource setting #0) is linked using multiple Links (Links #0 and #1) in which both "on" and "off" are designated, the UE 10 assumes the Resource setting is "off."

Figure 10A:
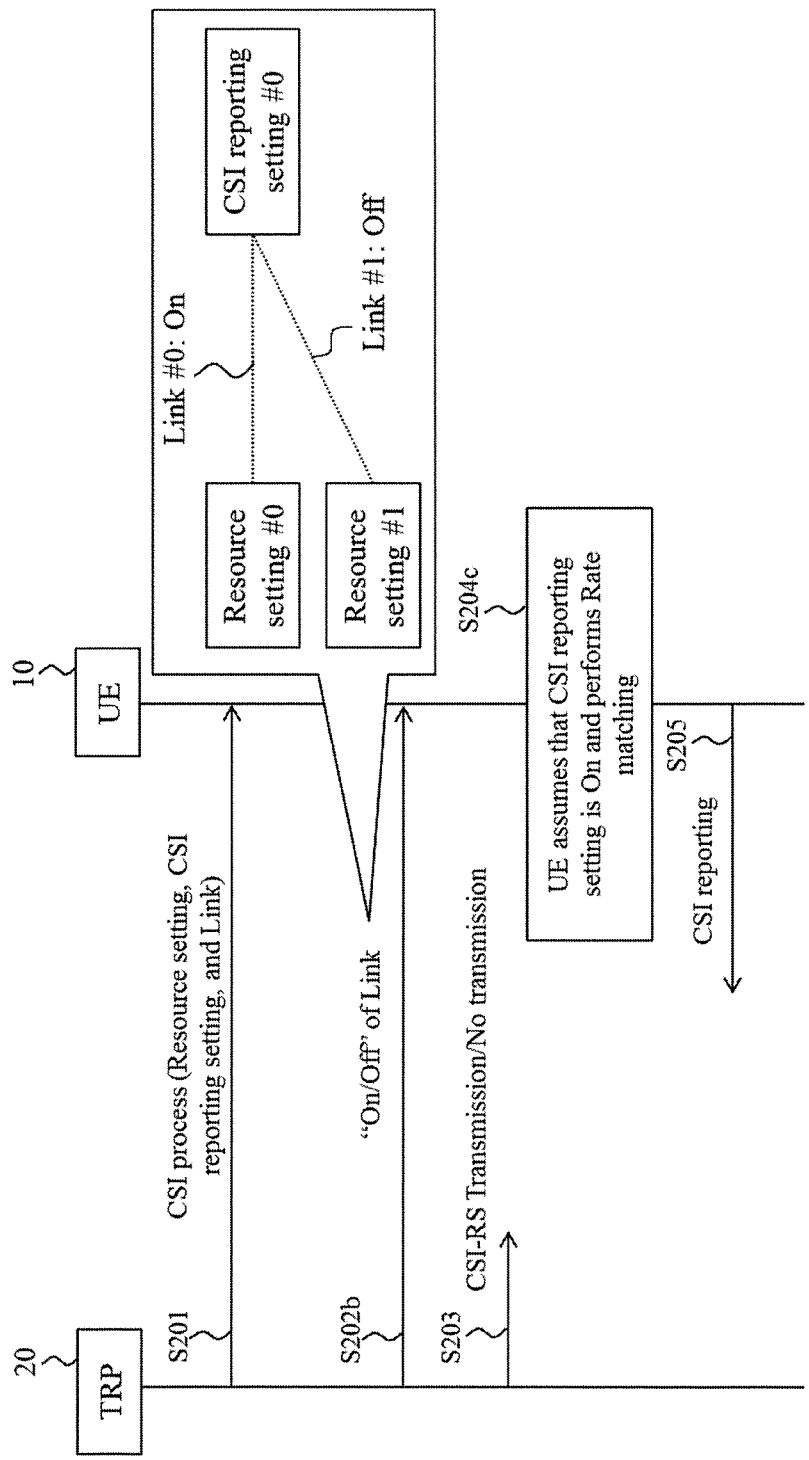
FIGS. 10A and 10B are sequence diagrams showing an operation example of a CSI acquisition scheme according to one or more embodiments of a second modified example of the present invention.
Figure 10B:
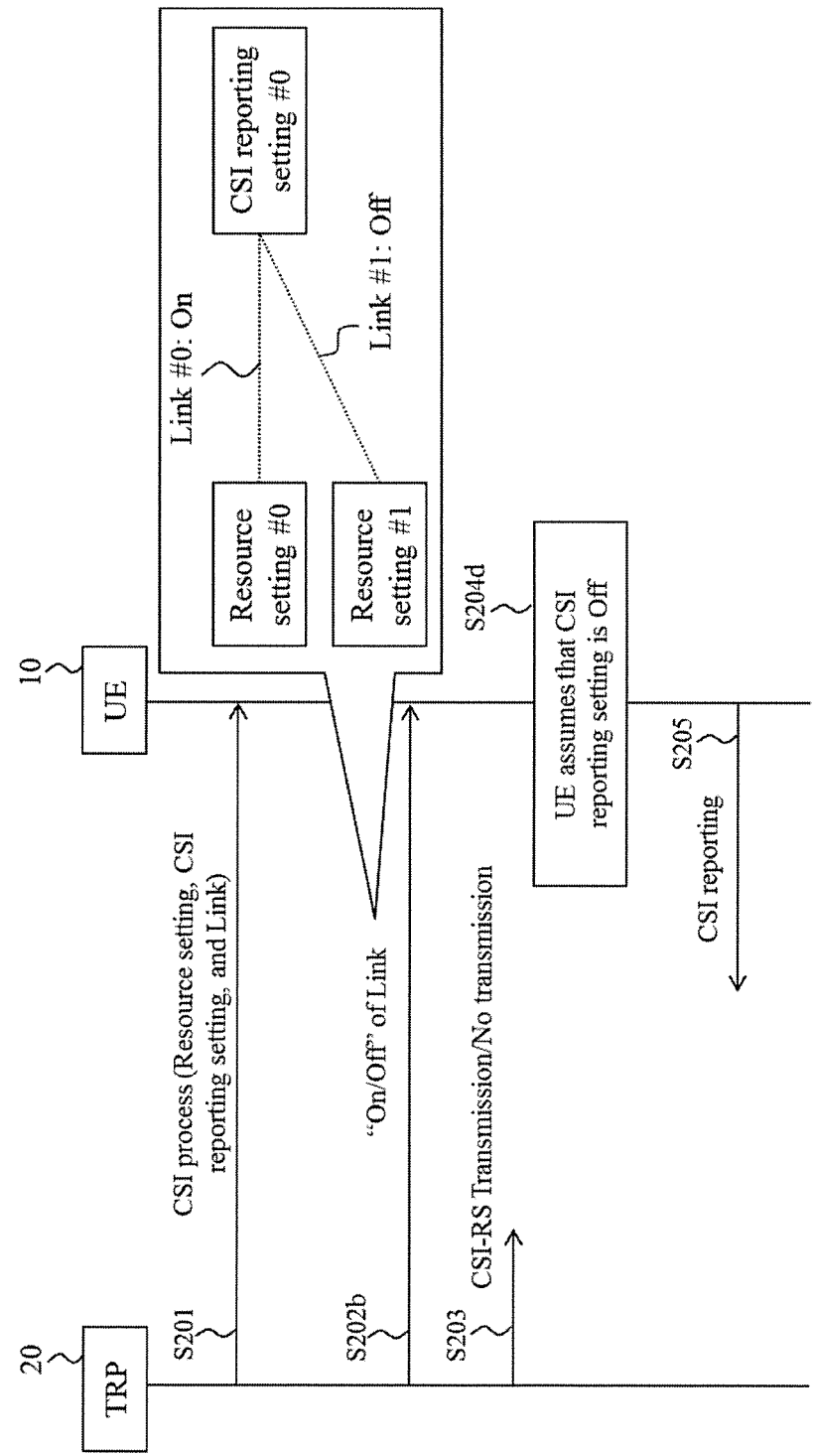

FIGS. 10A and 10B show operation of the UE 10 in case that one CSI reporting setting is linked using multiple Links in which both "on" and "off" are designated.

As shown in FIG. 10A, at step S202b, the TRP 20 may transmit on/off information indicating on/off of the Link. In FIG. 10A, for example, in the on/off information, CSI reporting setting #0 is linked to Resource settings #0 and #1 via Links #0 and #1, respectively. "On" is designated in the Link #0 and "off" is designated in the Link #1.

At step S204c, when one CSI reporting setting (CSI reporting setting #0) is linked using multiple Links (Links #0 and #1) in which both "on" and "off" are designated, the UE 10 assumes the CSI reporting setting is "on." For example, the UE 10 assumes the Resource setting (Resource setting #0) linked using the Link (Link #0) in which "on" is designated is "on."

In FIG. 10B, at step S204d, when one CSI reporting setting (CSI reporting setting #0) is linked using multiple Links (Links #0 and #1) in which both "on" and "off" are designated, the UE 10 assumes the CSI reporting setting is "off."

Third Example

According to one or more embodiments of a third example of the present invention, "Resource set" may be notified in each Resource setting to the UE 10.

Figure 11:
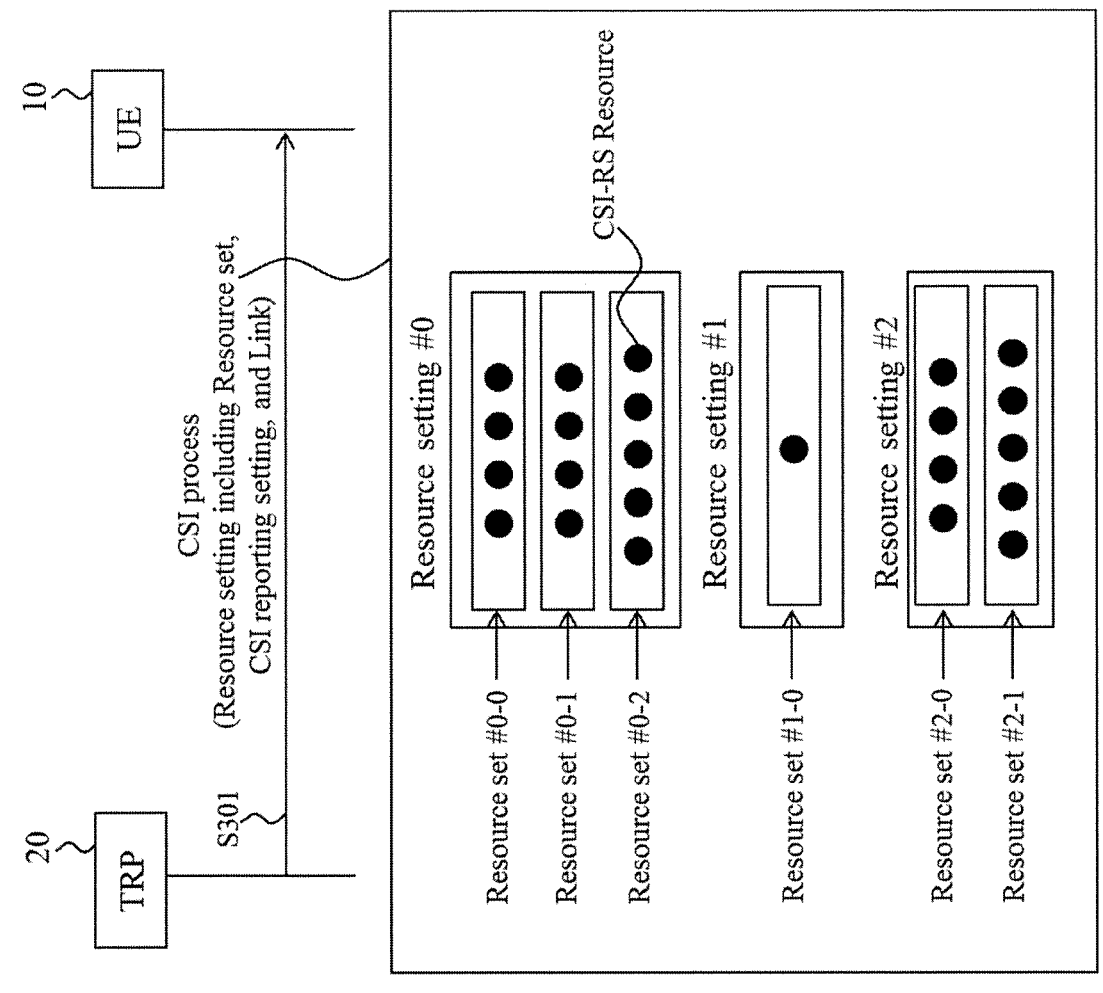
FIG. 11 is a sequence diagram showing an operation example of a CSI acquisition scheme according to one or more embodiments of a third example of the present invention.

As shown in FIG. 11, at step S301, the TRP 20 may transmit the CSI process including the Resource setting, CSI reporting setting, and Link. In one or more embodiments of a third example of the present invention, the Resource setting includes the Resource set. For example, in FIG. 11, Resource setting #0 includes Resource sets #0-0, #0-1, and #0-2. Resource setting #1 includes Resource sets #1-0. Resource setting #2 includes Resource sets #2-0, #2-1.

Third Modified Example

Figure 12:
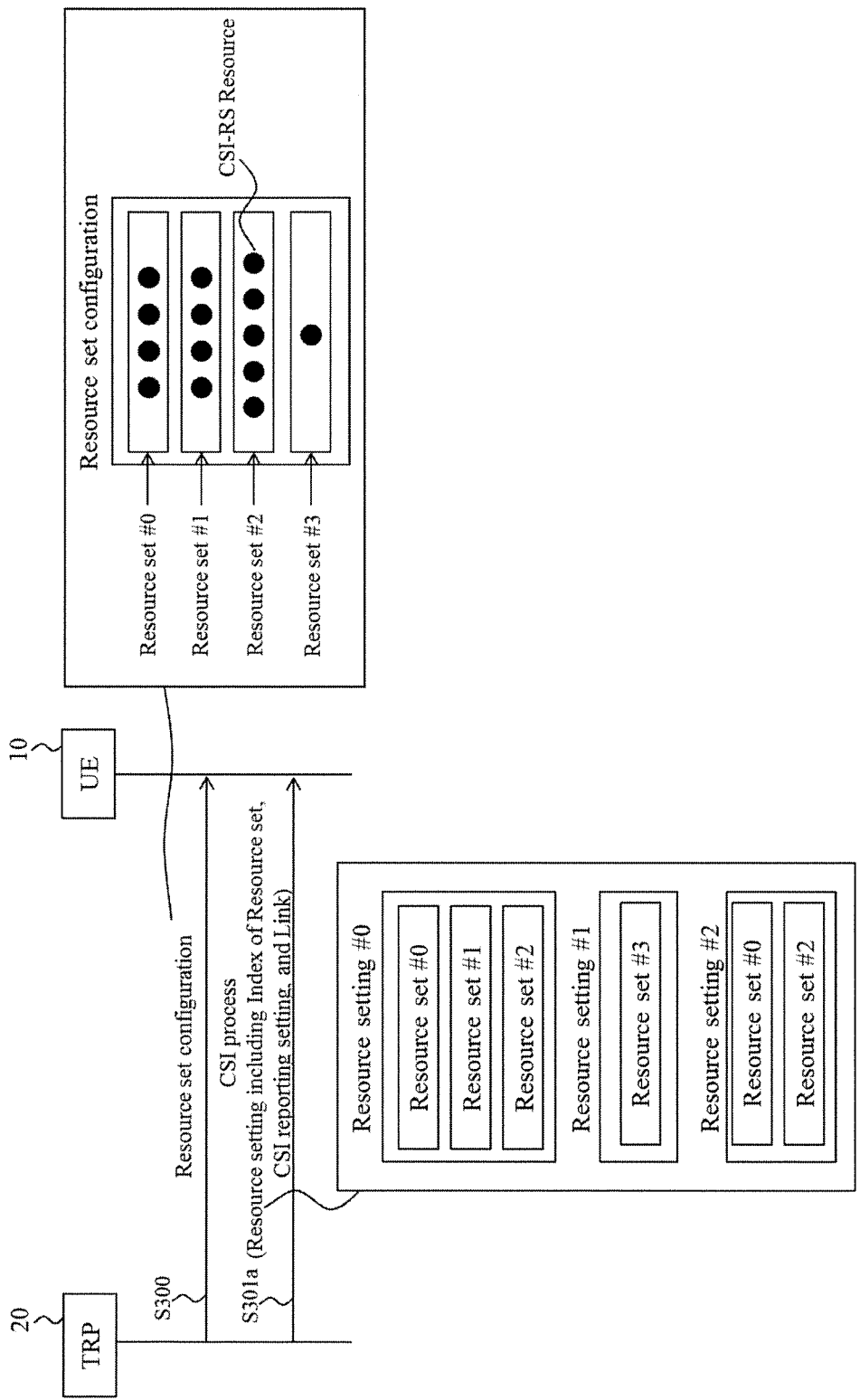
FIG. 12 is a sequence diagram showing an operation example of a CSI acquisition scheme according to one or more embodiments of a third modified example of the present invention.

According to one or more embodiments of a third modified example of the present invention, the Resource set and the Resource setting may be notified separately. As shown in FIG. 12, at step S300, the TRP 20 may transmit Resource set configuration indicating each Resource set. Then at step S301a, the TRP 20 may transmit the Resource setting including indexes of the Resource sets.

Furthermore, the Resource set configuration may be independent of channel management and interference measurement or common to the channel management and the interference measurement.

Fourth Example

According to one or more embodiments of a fourth example of the present invention, "CSI-RS resource configuration" may be notified in each Resource set to the UE 10. The CSI-RS resource configuration may be information used to receive the CSI-RSs by the UE 10. For example, the CSI-RS resource configuration includes the number of Antenna Ports (APs), Resource Element (RE) information indicating RE positions, transmission periodicity, a timing offset, frequency positions, Code Division Multiplexing (CDM) information, and multiplexing density.

Figure 13:
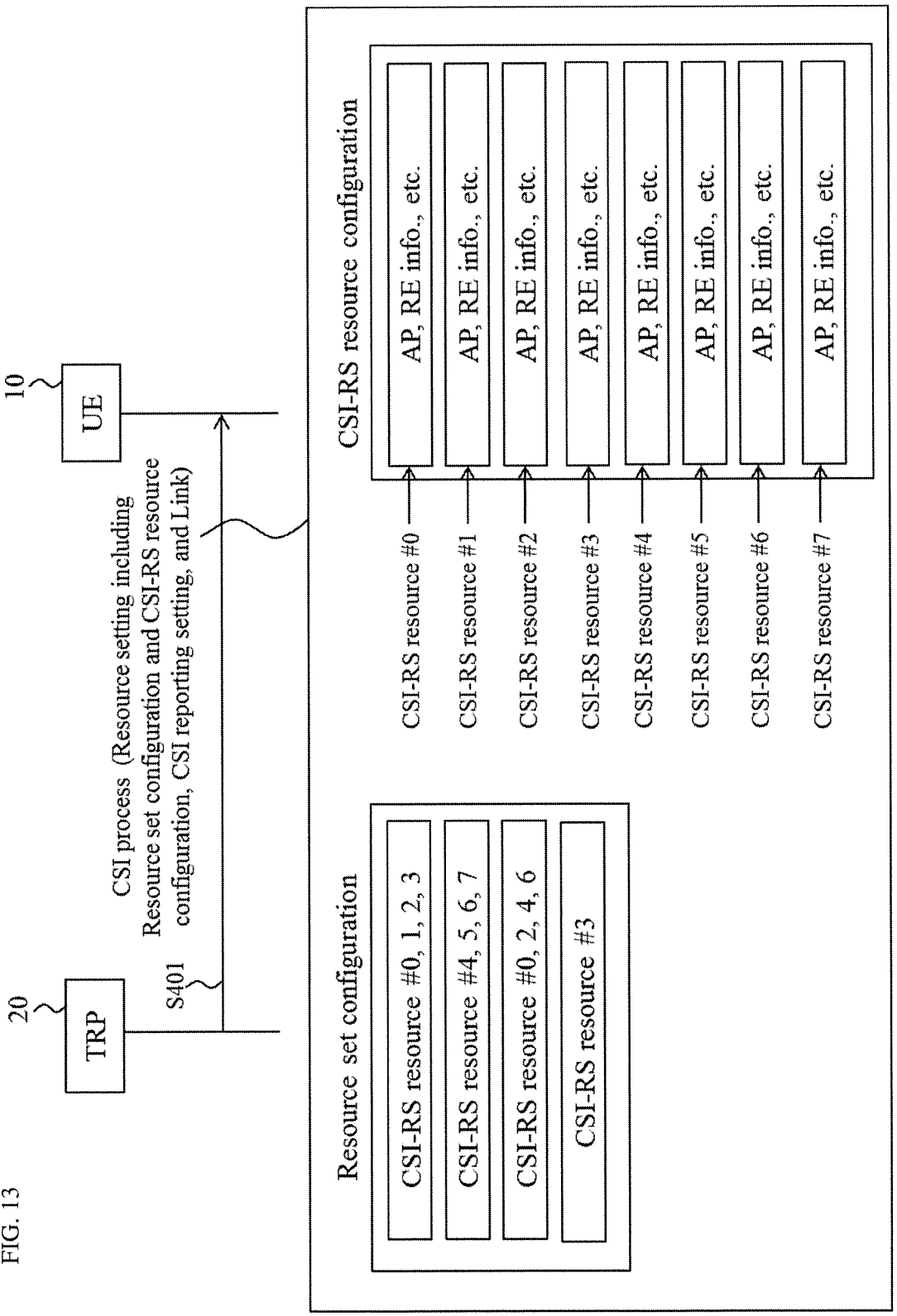
FIG. 13 is a sequence diagram showing an operation example of a CSI acquisition scheme according to one or more embodiments of a fourth example of the present invention.

As shown in FIG. 13, at step S401, the Resource setting in the CSI process may include the Resource set configuration and the CSI-RS resource configuration. Each of the CSI-RS resources #0-#7 includes AP (the number of APs), and RE information, etc.

Fourth Modified Example

Figure 14:
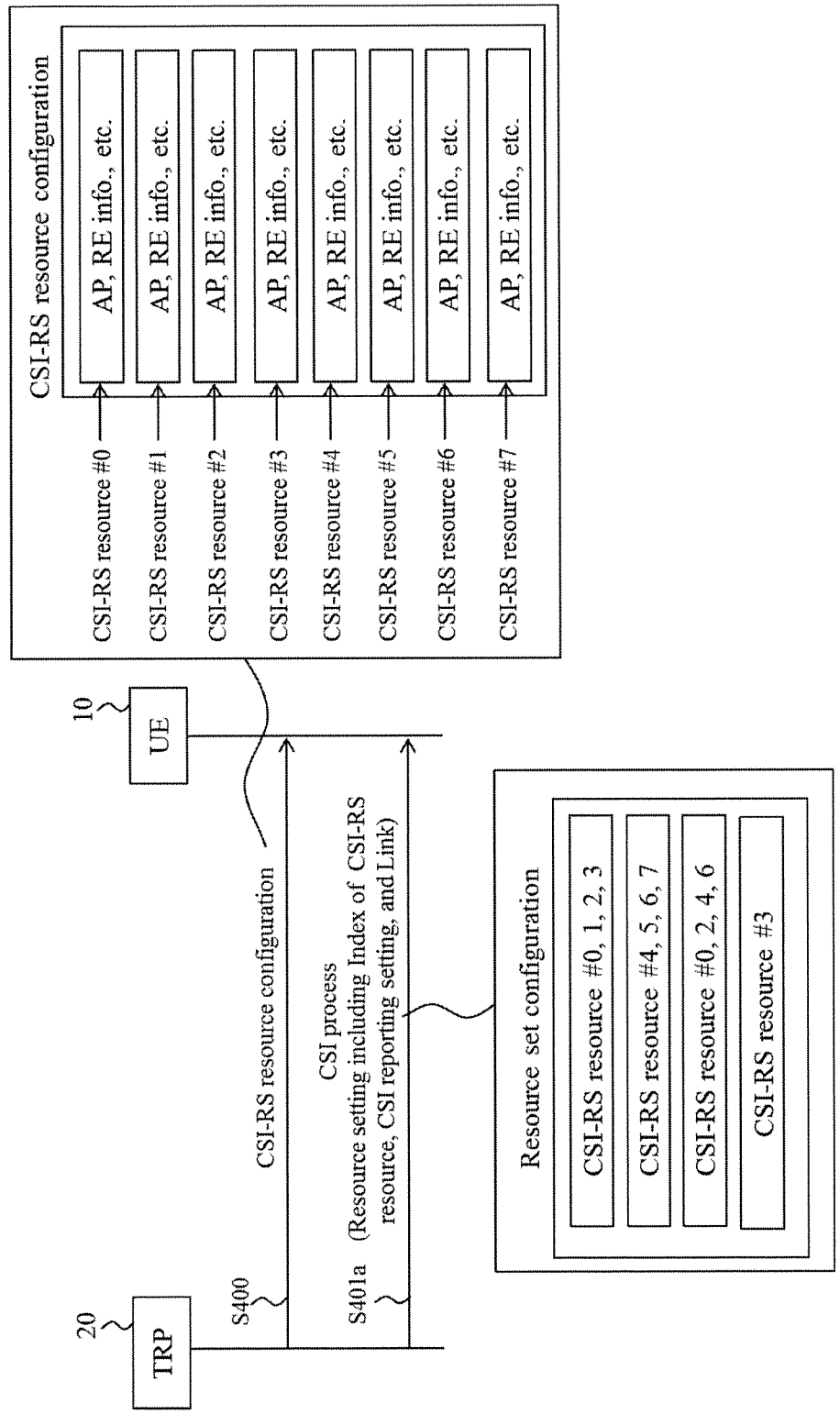
FIG. 14 is a sequence diagram showing an operation example of a CSI acquisition scheme according to one or more embodiments of a fourth modified example of the present invention.

According to one or more embodiments of a fourth modified example of the present invention, the Resource set configuration and the CSI-RS resource configuration may be notified separately. As shown in FIG. 14, at step S400, the TRP 20 may transmit the CSI-RS resource configuration. Then, at step S401a, the TRP 20 may transmit the Resource set configuration indicating indexes of the CSI-RS resources.

Fifth Example

In one or more embodiments of the present invention, each Resource setting includes one or more Resource sets. According to one or more embodiments of a fifth example of the present invention, on (activation) or off (deactivation) may be set in each of one or more Resource sets. In other words, each Resource set may be turned on/off independently. That is, "on/off" of each Resource set may be designated. In each Resource set, the common "on/off" of the CSI-RS resources in the same CSI-RS resource set may be designated.

As shown in FIG. 15, according to one or more embodiments of the fifth example of the present invention, "on" of only a Resource set in each Resource setting may be designated. That is, "on (activation)" is set to one of the one or more Resource sets.

As shown in FIG. 16, according to one or more embodiments of the fifth example of the present invention, "on" of multiple Resource sets in each Resource setting may be allowed to be designated. The UE 10 may perform the CSI acquisition using the CSI-RS resources in the multiple Resource sets in which "on" is designated.

According to one or more embodiments of the fifth example of the present invention, "on/off" is informed hierarchic manner. For example, "on/off" can be informed for both of Resource set and Resource setting. As another example, "on/off" can be informed for both of CSI-RS resource and Resource setting.

(Configuration of TRP)

Figure 17:
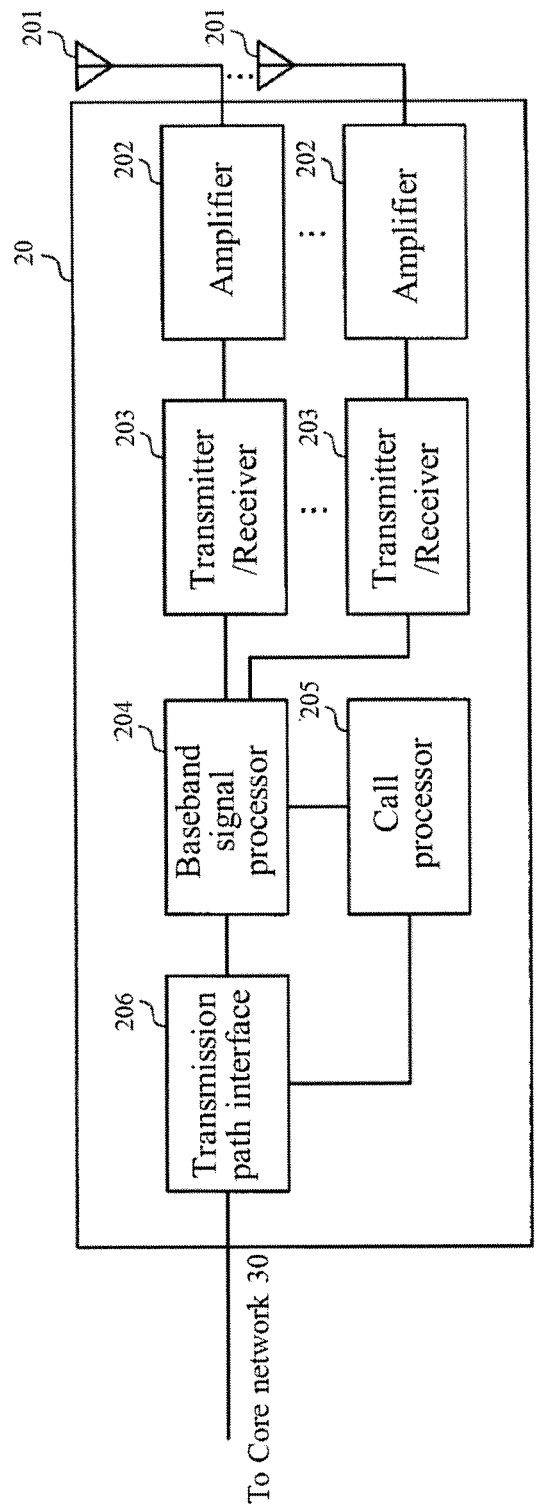
FIG. 17 is a diagram showing a schematic configuration of the TRP according to one or more embodiments of the present invention.

The TRP 20 according to one or more embodiments of the present invention will be described below with reference to FIG. 17. FIG. 17 is a diagram illustrating a schematic configuration of the TRP 20 according to one or more embodiments of the present invention. The TRP 20 may include a plurality of antennas (antenna element group) 201, amplifier 202, transceiver (transmitter/receiver) 203, a baseband signal processor 204, a call processor 205 and a transmission path interface 206.

User data that is transmitted on the DL from the TRP 20 to the UE 20 is input from the core network 30, through the transmission path interface 206, into the baseband signal processor 204.

In the baseband signal processor 204, signals are subjected to Packet Data Convergence Protocol (PDCP) layer processing, Radio Link Control (RLC) layer transmission processing such as division and coupling of user data and RLC retransmission control transmission processing, Medium Access Control (MAC) retransmission control, including, for example, HARQ transmission processing, scheduling, transport format selection, channel coding, inverse fast Fourier transform (IFFT) processing, and precoding processing. Then, the resultant signals are transferred to each transceiver 203. As for signals of the DL control channel, transmission processing is performed, including channel coding and inverse fast Fourier transform, and the resultant signals are transmitted to each transceiver 203.

The baseband signal processor 204 notifies each UE 10 of control information (system information) for communication in the cell by higher layer signaling (e.g., RRC signaling and broadcast channel). Information for communication in the cell includes, for example, UL or DL system bandwidth.

In each transceiver 203, baseband signals that are precoded per antenna and output from the baseband signal processor 204 are subjected to frequency conversion processing into a radio frequency band. The amplifier 202 amplifies the radio frequency signals having been subjected to frequency conversion, and the resultant signals are transmitted from the antennas 201.

As for data to be transmitted on the UL from the UE 10 to the TRP 20, radio frequency signals are received in each antennas 201, amplified in the amplifier 202, subjected to frequency conversion and converted into baseband signals in the transceiver 203, and are input to the baseband signal processor 204.

The baseband signal processor 204 performs FFT processing, IDFT processing, error correction decoding, MAC retransmission control reception processing, and RLC layer and PDCP layer reception processing on the user data included in the received baseband signals. Then, the resultant signals are transferred to the core network 30 through the transmission path interface 206. The call processor 205 performs call processing such as setting up and releasing a communication channel, manages the state of the TRP 20, and manages the radio resources.

(Configuration of User Equipment)

Figure 18:
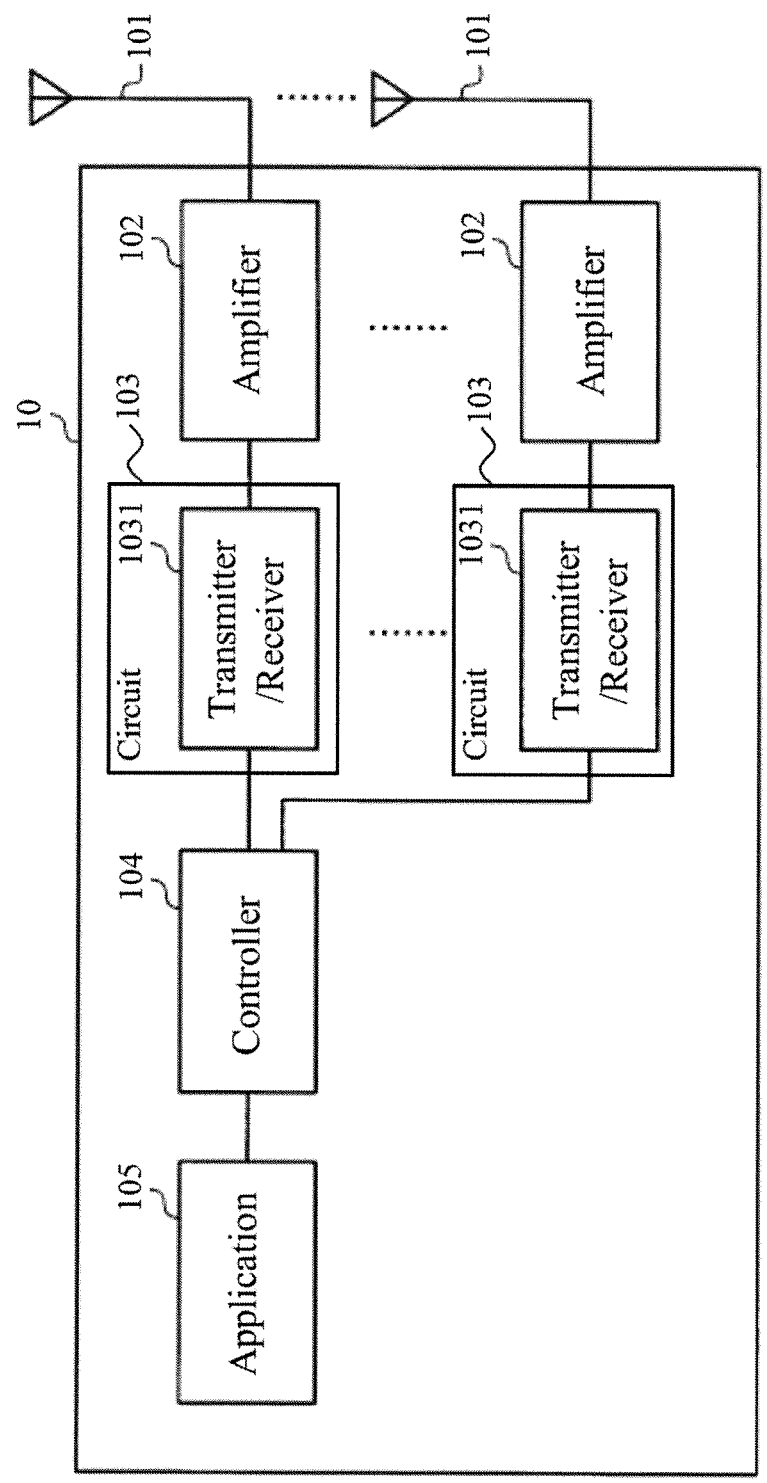
FIG. 18 is a diagram showing a schematic configuration of the UE according to one or more embodiments of the present invention.

The UE 10 according to one or more embodiments of the present invention will be described below with reference to FIG. 18. FIG. 18 is a schematic configuration of the UE 10 according to one or more embodiments of the present invention. The UE 10 has a plurality of UE antennas 101, amplifiers 102, the circuit 103 comprising transceiver (transmitter/receiver) 1031, the controller 104, and an application 105.

As for DL, radio frequency signals received in the UE antennas 101 are amplified in the respective amplifiers 102, and subjected to frequency conversion into baseband signals in the transceiver 1031. These baseband signals are subjected to reception processing such as FFT processing, error correction decoding and retransmission control and so on, in the controller 104. The DL user data is transferred to the application 105. The application 105 performs processing related to higher layers above the physical layer and the MAC layer. In the downlink data, broadcast information is also transferred to the application 105.

On the other hand, UL user data is input from the application 105 to the controller 104. In the controller 104, retransmission control (Hybrid ARQ) transmission processing, channel coding, precoding, DFT processing, IFFT processing and so on are performed, and the resultant signals are transferred to each transceiver 1031. In the transceiver 1031, the baseband signals output from the controller 104 are converted into a radio frequency band. After that, the frequency-converted radio frequency signals are amplified in the amplifier 102, and then, transmitted from the antenna 101.

Another Example

One or more embodiments of the present invention may be used for each of the uplink and the downlink independently. One or more embodiments of the present invention may be also used for both of the uplink and the downlink in common.

Although the present disclosure mainly described examples of a channel and signaling scheme based on NR, the present invention is not limited thereto. One or more embodiments of the present invention may apply to another channel and signaling scheme having the same functions as NR such as LTE/LTE-A and a newly defined channel and signaling scheme.

Although the present disclosure mainly described examples of technologies based on the CSI-RS, the present invention is not limited thereto. One or more embodiments of the present invention may apply to another synchronization signal, reference signal, and physical channel such as Primary Synchronization Signal/Secondary Synchronization Signal (PSS/SSS) and Sounding Reference Signal (SRS).

Although the present disclosure described examples of various signaling methods, the signaling according to one or more embodiments of the present invention may be explicitly or implicitly performed.

Although the present disclosure mainly described examples of various signaling methods, the signaling according to one or more embodiments of the present invention may be the higher layer signaling such as the RRC signaling and/or the lower layer signaling such as the DCI and the MAC CE. Furthermore, the signaling according to one or more embodiments of the present invention may use a Master Information Block (MIB) and/or a System Information Block (SIB). For example, at least two of the RRC, the DCI, and the MAC CE may be used in combination as the signaling according to one or more embodiments of the present invention.

The above examples and modified examples may be combined with each other, and various features of these examples can be combined with each other in various combinations. The invention is not limited to the specific combinations disclosed herein.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

What is claimed is:

1. A terminal comprising:
   a receiver that receives a resource setting and a plurality of reporting settings corresponding to a channel state information-reference signal (CSI-RS); and
   a transmitter that, when an information is set to on, transmits a report corresponding to the CSI-RS based on any of the reporting settings using the information, the information relating to the resource setting and the any of the reporting settings among the plurality of reporting settings,
   wherein each of the resource setting and the plurality of reporting settings comprises on/off switching information.

2. A radio communication method for a terminal, comprising:
   receiving a resource setting and a plurality of reporting settings corresponding to a channel state information-reference signal (CSI-RS); and
   when an information is set to on, transmitting a report corresponding to the CSI-RS based on any of the reporting settings using the information, the information relating to the resource setting and the any of the reporting settings among the plurality of reporting settings,
   wherein each of the resource setting and the plurality of reporting settings comprises on/off switching information.

3. A base station comprising:
   a transmitter that transmits a resource setting and a plurality of reporting settings corresponding to a channel state information-reference signal (CSI-RS); and
   a receiver that, when an information is set to on, receives a report corresponding to the CSI-RS transmitted based on any of the reporting settings using the information, the information relating to the resource setting and the any of the reporting settings among the plurality of reporting settings, wherein each of the resource setting and the plurality of reporting settings comprises on/off switching information.

4. A system comprising a base station and a terminal, wherein the base station comprises:
  a first transmitter that transmits a resource setting and a plurality of reporting settings corresponding to a channel state information-reference signal (CSIRS); and
the terminal comprises:
  a receiver that receives the resource setting and the plurality of reporting settings corresponding to the CSI-RS; and
  a second transmitter that, when an information is set to on, transmits a report corresponding to the CSI-RS based on any of the reporting settings using the information, the information relating to the resource setting and the any of the reporting settings among the plurality of reporting settings,
  wherein each of the resource setting and the plurality of reporting settings comprises on/off switching information.

* * * * *